Feb. 19, 1963 L. J. TUMMERS ET AL 3,078,397
TRANSISTOR
Filed Feb. 21, 1955
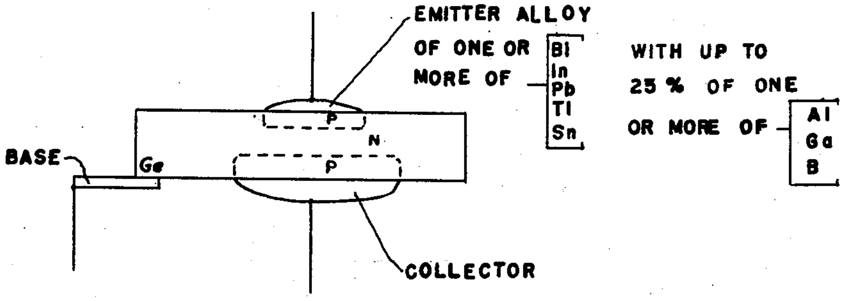
INVENTORS
L.J. TUMMERS
P.W. HAAYMAN
BY
Fred M. Vogel
AGENT

United States Patent Office

3,078,397

Patented Feb. 19, 1963

3,078,397

TRANSISTOR

Leonard Johan Tummers and Pieter Willem Haayman, Emmasingel, Eindhoven, Netherlands, assignors, by mesne assignments, to North American Philips Company, Inc., New York, N.Y., a corporation of Delaware Filed Feb. 21, 1955, Ser. No. 489,644
Claims priority, application Netherlands Feb. 27, 1954
20 Claims. (Cl. 317—235)

The invention relates to a transistor and in particular to a transistor comprising a semi-conductive body of N-type germanium.

Transistors generally comprise at least three electrodes, two of which, the emitter and the collector, constitute rectifying connections to the semi-conductive body, and the third of which, the base contact, constitutes an ohmic connection to the body. The invention is concerned with those transistors wherein at least the emitter is constituted of an alloy containing one or more of the following metals; bismuth, indium, lead, thallium and/or tin; and, if desired, in addition some germanium. A very frequently used method for making the emitter and the collector, known as the alloying method, consists in fusing to the N-type semi-conductive body a small quantity of an alloy containing an acceptor impurity, i.e., an element producing acceptors in the semi-conductive body, so that at the fused area a regrown semi-conductive region or layer of P-type conductivity can be produced.

It should be noted that where reference is made to an emitter, this is to be understood to mean the part of the electrode which is made from an alloy and which gives rise to the production of the regrown P-type layer or emitter region during fusion and which absorbs at most a small quantity of germanium during this production. Within the scope of the invention, it is possible to remove for the major part the alloy formed on the regrown P-type layer after it has been produced and to replace it by a different contact metal, which will, in general, not affect the properties of the resultant transistor. The important consideration is the composition of the alloy producing the P-type layer, and not that of a subsequently-added contact.

When using such a transistor, the emitter is, in general, biased in the forward direction and the collector in the blocking or reverse direction. In a circuit arrangement frequently employed, the "grounded emitter arrangement," in which the emitter constitutes the electrode common to the input and the output circuits, the current amplifying factor $\alpha'$, also indicated by $\alpha_{cb}$, is an important parameter. This factor denotes the relationship between the collector current and the base current:

$$\alpha' = \alpha_{cb} = \left(\frac{\partial I_c}{\partial I_b}\right) V_{ce} = \text{constant}$$

wherein $I_c$ and $I_b$ designate the collector current and the current through the base contact, respectively, and $V_{ce}$ designates the voltage between the emitter and the collector. With many transistors operated in this arrangement, there exists the disadvantage that the factor $\alpha'$ rises to a maximum value with increasing emitter current, and then falls off rapidly, which is, of course, disadvantageous particularly with high power transistors.

The chief object of the invention is to obviate this disadvantage.

The invention is based on the realization that an excessively low value of the current gain factor $\alpha'$ and its decrease with higher currents in the known transistors are to be ascribed for a large part to inadequate emitter output, i.e. an excessively small ratio between the hole current introduced into the base and the total emitter current, which is known as low emitter efficiency. This is overcome in accordance with the invention by forming the alloy referred to above and constituting the material for the emitter with not more than 25% of one or more of those chemical elements having an atomic number of less than 48 and exhibiting an $S^2P'$ configuration of its outer electrons, i.e., aluminum, boron and gallium. In other words, the emitter alloy will be constituted by not more than 25% by weight of addition acceptor elements Al, B, and/or Ga, and the remainder of one or more of the metals Bi, In, Pb, Tl, and/or Sn, and possibly Ge. In many cases, a materially lower content of the addition elements is capable of producing the desired effect, for example, a content of 5% or even 1% or less.

The invention will now be described more fully with reference to a few specific embodiments thereof, reference being made to the accompanying drawing of which the sole FIGURE is a side view of a transistor according to the invention.

The transistor may be produced on a disc or wafer of an N-type germanium monocrystal having a specfic resistance of 3 ohm-cm. and dimensions of 2 x 3 mms., and of 0.1 mm. in thickness. Opposite one another, to the two largest side surfaces, are fused the emitter and the collector alloys. The emitter is as a rule slightly smaller than the collector. On the side of the monocrystal is provided an ohmic base contact by means of tin solder.

If an alloy is chosen for the emitter which contains 1% by weight of gallium and the remainder indium, in accordance with the invention, and with the collector made, as usual, of indium alone, it was found that the current amplification factor $\alpha'$, at an emitter current of 1 a., had a value of 35; whereas a transistor having an emitter of pure indium and being otherwise identical with the former, for comparison purposes, had a current amplification factor $\alpha'$ which dropped to 20 at an emitter current of only 150 ma. The former transistor of the invention on the other hand had a current amplification factor of 50 at an emitter current of 100 ma. Hence, by means of the invention, it was found that $\alpha'$ did not fall off at high emitter currents but remained uniformly high, effecting an important improvement in the operating characteristics of such transistors.

Further examples of satisfactory compositions of the emitter alloy suitable for the production of the emitter regrown region, all in weight percent, are:

| | Bi | Ge | In | Pb | Tl | Sn | Addition elements | | |
|---|---|---|---|---|---|---|---|---|---|
| | | | | | | | Al | B | Ga |
| 1 | | | 99 | | | | ½ | | ½ |
| 2 | | | 99 | | | | 1 | | |
| 3 | | | 95 | | | | | | 5 |
| 4 | | | 95 | | | | 2½ | | 2½ |
| 5 | | 5 | 94½ | | | | | ½ | |
| 6 | 99 | | | | | | 1 | | |
| 7 | | | | | 98 | | | | 2 |
| 8 | | 3 | | 96 | | | 1 | | |
| 9 | | | | | | 99½ | ½ | | |
| 10 | 10 | 3 | | 60 | | 26½ | | | ½ |
| 11 | | 5 | 94 | | | | | | 1 |

The aforesaid data relate to the composition of the emitter alloy in percent by weight prior to fusion or melting down. The variation in the composition subsequent to melting down is very slight. In general, a small quantity of germanium will be absorbed from the semi-conductive body.

In carrying out the invention, the alloy may be prepared beforehand by mixing and melting together the desired constituents. For example for making the alloy 99% In and 1% Ga, the two constituents in the proper mixture are simply heated to about 160° C. for about ¼ of an hour in vacuum, and then simply allowed to cool to room temperature. Thereafter, a small amount of this alloy, to serve as the emitter, is placed on top of an etched surface, etched with, for example, a mixture of $HNO_3$ and HF, of the N-type germanium single-crystal body, having a specific resistance of 3 ohm-cm., the body with the alloy placed in an oven and heated to about 500° C. in a $H_2$ atmosphere to cause the alloy pellet to stick to the body. Then, the collector alloy and base contact are placed on the other side. The body is then heated and maintained at a temperature of about 500–520° C. in the same atmosphere for about 10 minutes, during which time the emitter and collector alloys have fused to the germanium body, after which it is removed from the oven and allowed to cool to room temperature. Thereafter, terminal connections are made to the emitter and collector, and the completed body mounted in a suitable housing.

The production of the P-type layers in the N-type body by this alloy technique, it will be observed, is quite conventional in that the same temperatures, atmospheres and time of heating as that usually employed in this field are used. The unusual advantages obtained with the transistor of the invention stem not from the steps of its preparation, but from the composition of the emitter alloy employed in producing the P–N junction in the germanium body.

Preferred emitter alloys of the invention are as follows:

A. 0.05–5% of Ga, and the remainder In.
B. ½–1% of Al, 1–10% of Ga, and the remainder In.
C. 0.5–5% of Al, and the remainder Bi.
D. 0.5–10% of Ga, and the remainder Tl.
E. 0.5–5% of Al, 1–10% of Ge, and the remainder Pb.
F. 0.5–8% of Al, and the remainder Sn.
G. 0.5–5% of Ga, 1–10% of Ge, and the remainder In.

In addition to the elements listed above, the emitter alloy of the invention may contain, in general, other elements of a neutral or inert, i.e. non-doping character. However, the desired characteristics of the invention are imparted, essentially, by the combination of at least one of the metals bismuth, indium, lead, thallium and/or tin together with boron, aluminum or gallium in the range specified.

Reference is made to our copending application, Serial No. 496,278, filed March 23, 1955, which is a continuation-in-part of this application and contains related subject matter.

While we have described our invention in connection with specific embodiments and applications, other modifications thereof will be radily apparent to those skilled in this art without departing from the spirit and scope of the invention as defined in the appended claims.

What is claimed is:

1. A semiconductive device comprising a body of substantially single crystal germanium of N-type conductivity, an electrode directly fused to and alloyed with said N-type body and producing a P-type region therein, said electrode being an alloy consisting essentially of indium and between 0.05 and 1% by weight of gallium, and connections to N and P-type regions of said body.

2. A transistor device comprising a semiconductive germanium body having an N-type base portion, an emitter electrode alloyed to the body producing in the body a P-type emitter region forming a high-efficiency-emitting rectifying junction with the N-type base portion, said emitter electrode containing bismuth as a principal constituent, and as an essential additive more than zero but less than 5% by weight of at least one acceptor element selected from the group consisting of boron, aluminum and gallium, said additive constituting the sole active acceptors forming the high-efficiency-emitting rectifying junction, an emitter connection coupled to said P-region, a base connection coupled to said N-type portion, and a collector rectifying connection to said body.

3. A transistor as set forth in claim 2 wherein the emitter electrode comprises principally bismuth with 0.5 to 5% by weight of aluminum.

4. A transistor as set forth in claim 2 wherein the emitter electrode further contains up to 10% by weight of germanium.

5. A transistor device comprising a semiconductive germanium body having an N-type base portion, an emitter electrode alloyed to the body producing in the body a P-type emitter region forming a high-efficiency-emitting rectifying junction with the N-type base portion, said emitter electrode consisting essentially of thallium and more than zero but less than 5% by weight of at least one element selected from the group consisting of boron, aluminum and gallium, an emitter connection coupled to said P-region, a base connection coupled to said N-type portion, and a collector rectifying connection to said body.

6. A transistor as set forth in claim 5 wherein the emitter electrode comprises principally thallium with 0.5 to 5% by weight of gallium.

7. A transistor as set forth in claim 5 wherein the emitter electrode further contains up to 10% by weight of germanium.

8. A transistor device comprising a semiconductive germanium body having an N-type base portion, an emitter electrode alloyed to the body producing in the body a P-type emitter region forming a high-efficiency-emitting rectifying junction with the N-type base portion, said emitter electrode containing lead as a principal constituent, and as an essential additive more than zero but less than 5% by weight of at least one element selected from the group consisting of boron, aluminum and gallium, said additive constituting the sole active acceptors forming the high-efficiency-emitting rectifying junction, an emitter coupled to said P-region, a base connection coupled to said N-type portion, and a collector rectifying connection to said body.

9. A transistor as set forth in claim 8 wherein the emitter electrode comprises principally lead with 0.5 to 5% by weight of aluminum.

10. A transistor as set forth in claim 8 wherein the emitter electrode further contains up to 10% by weight of germanium.

11. A transistor device comprising a semiconductive germanium body having an N-type base portion, an emitter electrode alloyed to the body producing in the body a P-type emitter region forming a high-efficiency-emitting rectifying junction with the N-type base portion, said emitter electrode containing tin as a principal constituent, and as an essential additive more than zero but less than 5% by weight of at least one element selected from the group consisting of boron, aluminum and gallium, said additive constituting the sole active acceptors forming the high-efficiency-emitting rectifying junction, an emitter connection coupled to said P-region, a base connection coupled to said N-type portion, and a collector rectifying connection to said body.

12. A transistor as set forth in claim 11 wherein the emitter electrode comprises principally tin with 0.5 to 5% by weight of aluminum.

13. A transistor as set forth in claim 11 wherein the emitter electrode further contains up to 10% by weight of germanium.

14. A transistor device comprising a semiconductive germanium body having an N-type base portion, an emitter electrode alloyed to the body producing in the body a P-type emitter region forming a high-efficiency-emitting rectifying junction with the N-type base portion, said emitter electrode containing indium as a principal constituent, and as an essential addition constituent more than zero but less than 5% by weight of boron, an emitter connection coupled to said P-region, a base connection coupled to said N-type portion, and a collector rectifying connection to said body.

15. A transistor as set forth in claim 14 wherein the emitter electrode further contains up to 10% by weight of germanium.

16. A transistor device comprising a semiconductive germanium body having an N-type base portion, an emitter electrode alloyed to the body producing in the body a P-type emitter region forming a high-efficiency-emitting rectifying junction with the N-type base portion, said emitter electrode containing indium as a principal constituent, and as an essential addition constituent more than zero but less than 5% by weight of gallium, an emitter connection coupled to said P-region, a base connection coupled to said N-type portion, and a collector rectifying connection to said body.

17. A transistor as set forth in claim 16 wherein the emitter electrode further contains up to 10% by weight of germanium.

18. A transistor as set forth in claim 16 wherein the emitter electrode comprises principally indium with 0.05 to 5% by weight of gallium.

19. A transistor comprising a semi-conductive germanium body comprising a P-type collector region and N-type base and P-type emitter regions cooperating to produce a high-efficiency, emitter, alloy junction, said P-type emitter region having been produced by fusing to said body a metal alloy mass consisting essentially of indium and more than zero but less than 1% by weight of gallium, and separate electrical contacts to said N-type and two P-type regions.

20. A transistor comprising a body of germanium semiconductive material having a P-type collector region and an N-type base region, and a rectifying electrode surface alloyed to the body to produce a P-type emitter region adjacent the base region, said electrode comprising principally indium alloyed with 0.05% to less than 1% gallium by weight.

References Cited in the file of this patent

UNITED STATES PATENTS

| | | |
|---|---|---|
| 2,569,347 | Shockley | Sept. 25, 1951 |
| 2,589,658 | Bardeen et al. | Mar. 18, 1952 |
| 2,697,269 | Fuller | Dec. 21, 1954 |
| 2,689,930 | Hall | Sept. 21, 1954 |
| 2,719,253 | Willardson et al. | Sept. 27, 1955 |
| 2,836,522 | Mueller | May 27, 1958 |

OTHER REFERENCES

Welker: Zeitschrift für Naturforschung, vol. 7a, pp. 744–749.

UNITED STATES PATENT OFFICE

CERTIFICATE OF CORRECTION

Patent No. 3,078,397 February 19, 1963

Leonard Johan Tummers et al.

It is hereby certified that error appears in the above numbered patent requiring correction and that the said Letters Patent should read as corrected below.

Column 2, line 29, after "solder." insert -- This results in the usual P-N-P junction transistor. --; column 3, line 50, for "descirbed" read -- described --; line 52, for "radily" read -- readily --.

Signed and sealed this 11th day of February 1964.

(SEAL)
Attest:

ERNEST W. SWIDER
Attesting Officer

EDWIN L. REYNOLDS
Acting Commissioner of Patents